United States Patent [19]

Redman

[11] 3,911,433
[45] Oct. 7, 1975

[54] INFRARED MICROWAVE TRANSPONDER

[75] Inventor: Charles M. Redman, Las Craces, N. Mex.

[73] Assignee: The United States of America as represented by the Secretary of the Army, Washington, D.C.

[22] Filed: July 12, 1974

[21] Appl. No.: 487,949

[52] U.S. Cl. ........... 343/6 ND; 343/6.8 R; 343/17.7
[51] Int. Cl.² ..... G01S 7/40; G01S 9/56; G01S 9/64
[58] Field of Search ............. 343/17.7, 6 ND, 6.8 R, 343/6.8 LC

[56] References Cited
UNITED STATES PATENTS

| | | | |
|---|---|---|---|
| 2,972,743 | 2/1961 | Svensson et al. | 343/6 ND X |
| 3,371,345 | 2/1968 | Lewis | 343/6.8 R X |
| 3,391,404 | 7/1968 | Vogelman | 343/6.8 R X |
| 3,671,963 | 6/1972 | Assouline et al. | 343/6 ND |
| 3,795,910 | 3/1974 | Robinson, Jr. | 343/17.7 X |

Primary Examiner—Malcolm F. Hubler
Attorney, Agent, or Firm—Nathan Edelberg; Robert P. Gibson; Saul Elbaum

[57] ABSTRACT

An infrared microwave transponder comprising antenna means for receiving through an infrared microwave lens an infrared signal which includes a microwave signal representative of radar reflections, means for demodulating the infrared signal and generating a microwave signal representative of the radar reflections, means for attenuating the microwave signal in inverse proportion to the magnitude of the infrared signal, and means for directing the attenuated microwave signal to the antenna means to cause radiation of the attenuated microwave signal through the infrared microwave lens.

9 Claims, 1 Drawing Figure

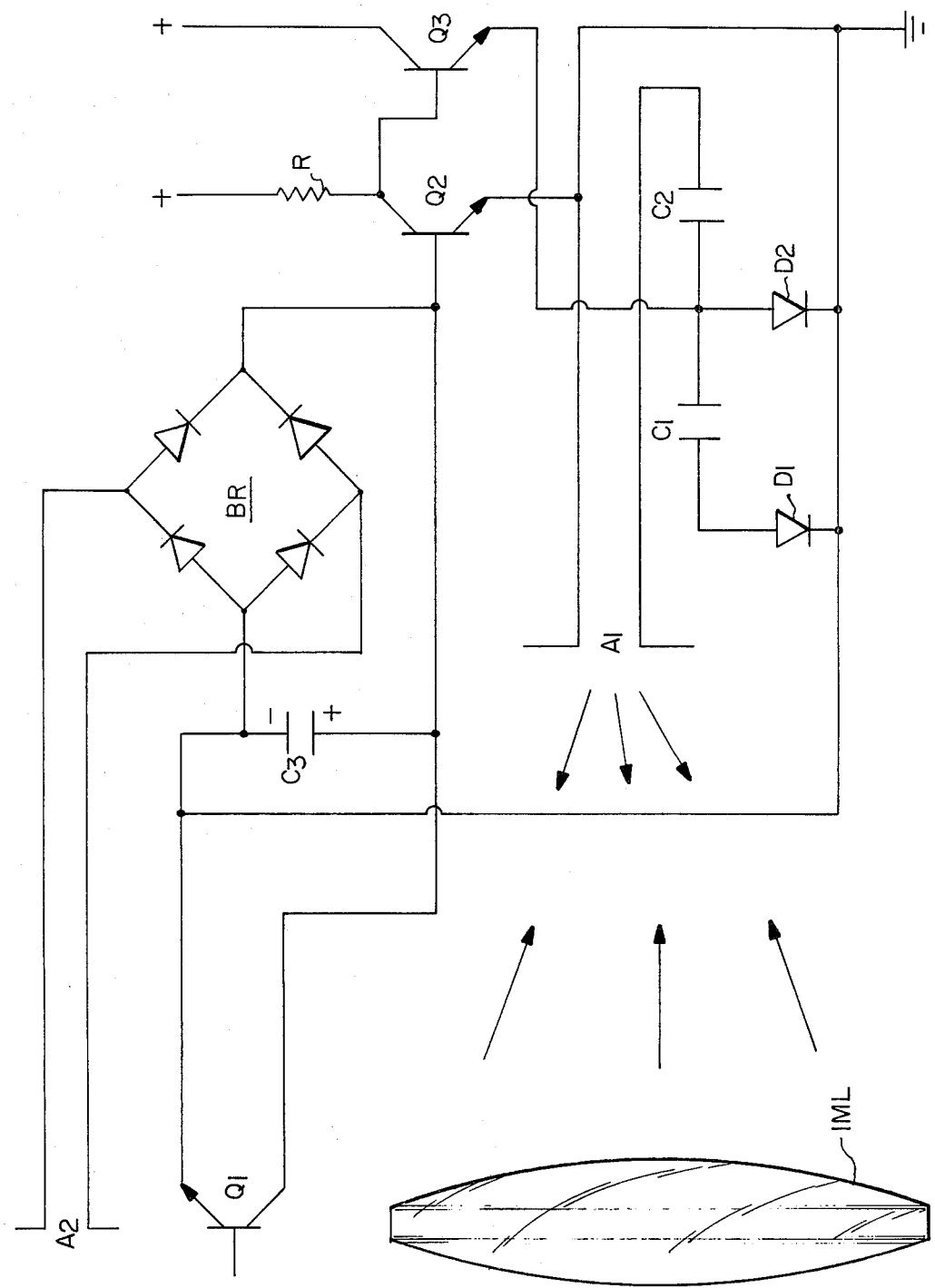

INFRARED MICROWAVE TRANSPONDER

RIGHTS OF THE GOVERNMENT

The invention described herein may be manufactured, used and licensed by or for the Government of the United States for governmental purposes without the payment to me of any royalty thereon.

BACKGROUND OF THE INVENTION

The infrared microwave transponder of the present invention receives a broadband signal and a reference signal in the infrared or visible spectrum and retransmits a microwave signal. Infrared as used in this specification refers to both the infrared and visible spectrums.

The infrared microwave transponder of the present invention is a general purpose device and is useful where it is advantageous to transmit in the infrared spectrum and retransmit in the microwave spectrum. A specific use for the infrared microwave transponder of the present invention is as elements in large microwave arrays used in the testing of complex radars or missile systems. Although the infrared microwave transponder of the present invention has its most direct application with angle simulation test arrays comprised of thousands of infrared microwave transponder elements, this should not be construed to mean that the infrared microwave transponder of the present invention is not useful in other applications.

An angle simulation test array consisting of thousands of infrared microwave transponder elements in accordance with the invention is used in test facilities required in the test and evaluation of complex weapon systems involving multifunction array radars, missiles, launchers, IFF interrogators, and communication systems. The basic principle of the test array is to receive radar type signals as frequency and amplitude differentials between two infrared signals and retransmit microwave signals which are identical to or very similar to radar signals reflected from aircraft, missiles, chaff cloud, ground terrain, and other objects found in radar space. The infrared beams may be coaxial and are normally directed at the angle simulation test array through the use of computer controlled galvanometers. A typical angle simulation test array would cover an angular space with respect to the radar of 120° in azimuth and 90° in elevation and be located on a section of a hemisphere with a radius of about 100 feet with the radar at the center. Smaller angle simulation test arrays would be used similarly in conjunction with missiles under tests.

The galvanometer directed infrared beams would normally be designed to illuminate approximately four of the infrared microwave transponders so that as infrared beams with constant differentials are moved across the angle simulation test array, the transponded microwave signals are constant. The infrared microwave transponders are normally located in the angle simulation test array with an angular spacing with respect to the radar of less than one third of the radar antenna beamwidth. The radar, therefore, does not recognize four different signals but, rather, sees but one signal from a point between the four infrared microwave transponders.

The coaxial infrared signals carry radar signals which have been processed in a radar target simulator where radar to target range delay, range attenuation, amplitude type of target signature, radial velocity doppler, and similar information has been added. The galvanometer directed infrared beams in conjunction with the angle simulation test array add angular position and angular target signature to the signals and convert them to radar frequency. Because there are so many infrared microwave transponders required in an angle simulation test array (for example, 28,000 are required in a 120° by 90° system), it is important that the infrared microwave transponder be relatively low in cost when manufactured in large quantities.

SUMMARY OF THE INVENTION

It is an object of the present invention to provide an infrared microwave transponder which may be used in the testing of complex radars or missile systems.

It is a further object of the present invention to provide an infrared microwave transponder which is both low in cost and simple in operation.

Other objects will appear hereinafter.

These and other objects are accomplished by the infrared microwave transponder of the present invention which comprises antenna means for receiving through an infrared microwave lens an infrared signal which includes a microwave signal representative of radar reflections, means for demodulating the infrared signal and generating a microwave signal representative of the radar reflections, means for attentuating the microwave signal in inverse proportion to the magnitude of the infrared signal, and means for directing the attenuated microwave signal to the antenna means to cause radiation of the attenuated microwave signal through the infrared microwave lens.

BRIEF DESCRIPTION OF THE DRAWING

Various objects, features and attendant advantages of the present invention will be more fully appreciated as the same becomes better understood from the following detailed description of the present invention when considered in connection with the accompanying drawing in which the FIGURE is a schematic view of the infrared microwave transponder of the present invention.

DETAILED DESCRIPTION OF A PREFERRED EMBODIMENT

As shown in the drawing, the circuitry of the present invention consists of an infrared microwave lens IML, first and second antennas $A_1$ and $A_2$, first, second and third capacitors $C_1$, $C_2$ and $C_3$, first and second diodes $D_1$ and $D_2$, first, second and third transistors $Q_1$, $Q_2$ and $Q_3$, a bridge rectifier BR and a resistor R. The manner in which the elements are connected and coact with one another is best described with reference to operation of the instant invention.

The two coaxial infrared signals are focused by the infrared microwave lens IML so as to illuminate diode $D_1$. Diode $D_1$ may be a PIN type diode although other types of diodes or devices may prove to be more efficient as technical developments occur. The function of $D_1$ is to heterodyne the two infrared signals and to develop a difference or microwave signal.

capacitors $C_1$ and $C_2$ isolate diode $D_2$ so that current can be passed through $D_2$ without affecting other elements in the microwave circuits. $D_2$ may also be a PIN diode and is used to attenuate the microwave signal in direct proportion to the current through the diode. The microwave signal detected by $D_1$ and attenuated by $D_2$ is radiated by antenna $A_1$ back through the infrared microwave lens.

$A_1$ is normally a broadband spiral antenna in order to permit the use of the infrared microwave transponder of the present invention with a variety of radars. $D_1$ is normally mounted at the center of $A_1$. The infrared microwave lens is not expected to have the same index of refraction for both infrared and microwave frequencies. The infrared microwave lens in $D_1$ must be mounted so as to focus the infrared signal to a point on $D_1$. The infrared microwave lens and $A_1$ must be so located that the microwave signal is an essentially flat wavefront at the radar antenna approximately 100 feet distant. Fringing of the microwave signal at the edge of the infrared microwave lens may be normally reduced by the use of an absorber cone around the infrared microwave transponder to absorb the microwave signal that does not pass through the center portion of the infrared microwave lens. The infrared microwave lens is preferably constructed of molded plastic in order to maintain costs at a minimum.

Various parameters have been found to be useful in the infrared microwave transponder of the instant invention although this is not to say that other parameters are not equally useful. For example, it has been found that the reference infrared signal may be 28,300 −3.692 GHz while the data infrared signal may be 28,300 + 1.758 + or −0.25 GHz. This yields a difference frequency of 5,450 + or −0.25 GHz. Obviously, other infrared and microwave frequencies may be utilized depending upon what microwave frequencies the radar under test utilizes and what infrared signal source and modulator are used. Satisfactory results can be obtained with the use of a carbon dioxide laser radiating on the 10.6 micron line (28,300 GHZ) and a Tellurium modulator with six stages to add 293 + or −4.17 MHz six times to obtain the 28,300 plus 1.758 + or −0.25 GHz and a Tellurium ten stage modulator to subtract 369.2 MHz ten times to obtain 28,300 − 3.692 GHz.

The infrared microwave transponder of the present invention includes two control circuits for use in an angle simulation test array. Antenna $A_2$ with bridge rectifier BR develops a control voltage across $C_3$ proportional to the magnitude of the radar transmission striking $A_2$. This signal is buffered through $Q_2$ and $Q_3$ and controls the current through $D_2$ so as to attenuate the microwave signals detected by $D_1$ inversely in proportion to the level of the radar transmission. This control, therefore, senses the magnitude of the radar transmission, memorizes it, and inversely controls the attenuator $D_2$. This causes the angle simulation test array to memorize the radar antenna pattern on a transmission by transmission basis.

The second control circuit is directed to the requirement that the memory must be erased just prior to each radar transmission. This is accomplished by an optical or infrared flash which causes phototransistor $Q_1$ to decrease to a low impedance which has the effect of shorting capacitor $C_3$.

A more detailed description of the operation of the infrared microwave transponder of the present invention is as follows: The sequence starts with an optical recycle signal directed to the infrared microwave transponder to zero the charge stored in capacitor $C_3$. This signal causes phototransistor $Q_1$ to be highly conductive thereby shorting out the charge in $C_3$. A zero charge on $C_3$ causes transistor $Q_2$ to be cut off which in turn causes $Q_3$ to conduct heavily which causes a high current to flow through attenuator diode $D_2$ causing a very low impedance therein. The rezero signal is removed and is followed by the radar transmission signal. The radar transmission signal is detected by antennas $A_1$ and $A_2$. However, initially, $A_1$ has a very low impedance to ground through $C_2$ and $D_2$ because of the high current and therefore low impedance in diode $D_2$. The signal received by $A_2$ is rectified by bridge rectifier BR and charges $C_3$ in a manner proportional to the magnitude of the radar transmission signal. Since the optical signal has been removed, $Q_1$ is at its high impedance state and therefore discharge therethrough is quite small. The charge stored in $C_3$ turns $Q_2$ on in proportion to the charge voltage. This causes a decrease in the current passing through $Q_3$ and $D_2$. Thus, it may be seen that the attenuation of microwave signals received by $A_1$ is inversely proportional to the radar signal received by $A_2$. The radar signal received by $A_1$ is, therefore, initially attentuated severely but as the current through $D_2$ decreases the attenuation is not so severe.

The radar target simulation signal carried by the infrared carrier is received by $D_1$ which detects the microwave modulation. The detected signal passes through $C_1$, is attenuated by $D_2$, passes through $C_2$ and is radiated by $A_1$.

Although the above set forth example utilizes two infrared signals and one stage for heterodyning, it is quite feasible to use three infrared signals and double heterodyning. Using such a system, the first stage develops an RF reference between two infrared reference signals and a data RF signal from a data infrared signal and the closest infrared reference signal. The RF reference and the RF signal are then heterodyned for the sum of the two. To illustrate, an infrared reference signal at 28,300 GHz could be added to the above discussed system and an RF reference of 3.692 GHz and an RF signal of 1.758 + or −0.25 GHz developed. A second heterodyning circuit would then add the two to develop 5.45 + or −0.25 GHz.

It is also to be recognized that the infrared microwave transponder of the present invention can operate on one amplitude modulated infrared signal. The infrared microwave transponder of the present invention has been more specifically disclosed with respect to a heterodyne demodulation system primarily because of anticipated problems in the design of amplitude modulators.

I wish it to be understood that I do not desire to be limited to the exact details of construction shown and described, for obvious modifications can be made by a person skilled in the art.

What is claimed as new and desired to be secured by letters patent of the United States is:

1. An infrared microwave transponder comprising:
   antenna means for receiving through an infrared microwave lens an infrared signal which includes a microwave signal representative of radar reflections,
   means for demodulating said infrared signal and generating a microwave signal representative of said radar reflections,
   means for attenuating said microwave signal in inverse proportion to the magnitude of said infrared signal, and means for directing an attenuated microwave signal to said antenna means to cause radiation of said attenuated microwave signal through said infrared microwave lens.

2. An infrared microwave transponder in accordance with claim 1, further comprising:
   a first diode for demodulating said infrared signal, and
   a second diode for attentuating said microwave signal.

3. An infrared microwave transponder in accordance with claim 2, wherein the impedance of said second diode varies inversely as the current through said second diode.

4. An infrared microwave transponder in accordance with claim 2, further comprising:
   a second antenna,
   a first transistor,
   a second transistor,
   a third transistor,
   a capacitor,
   means connecting said second antenna to said second transistor and to said capacitor,
   means connecting said first transistor to said capicitor,
   means connecting said second transistor to said third transistor,
   means connecting said third transistor to said second diode,
   whereby receipt of said infrared signal by said second antenna causes a decrease in current from said third transistor through said second diode causing an increase in impedance of said second diode.

5. An infrared microwave transponder in accordance with claim 4 wherein said first transistor is a phototransistor and wherein said capacitor is discharged by applying an optical recycle signal to said first transistor.

6. An infrared microwave transponder in accordance with claim 5 wherein said first diode is a PIN diode.

7. An infrared microwave transponder in accordance with claim 6 wherein said second diode is a PIN diode.

8. An infrared microwave transponder in accordance with claim 7 wherein said antenna means is a broadband spiral antenna.

9. An infrared microwave transponder in accordance with claim 8 wherein said infrared microwave lens is constructed of plastic.

\* \* \* \* \*